(12) United States Patent
Kim

(10) Patent No.: US 9,912,888 B2
(45) Date of Patent: Mar. 6, 2018

(54) PIXEL POWER NOISE CANCELLING APPARATUS AND METHOD FOR COPYING AND SUPERIMPOSING PIXEL POWER NOISE OF PIXEL COLUMN ON RAMP SIGNAL

(71) Applicant: SK hynix Inc., Gyeonggi-do (KR)

(72) Inventor: Tae-Gyu Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/187,327

(22) Filed: Jun. 20, 2016

(65) Prior Publication Data

US 2017/0163916 A1 Jun. 8, 2017

(30) Foreign Application Priority Data

Dec. 7, 2015 (KR) ........................ 10-2015-0172947

(51) Int. Cl.
*H04N 5/335* (2011.01)
*H04N 5/357* (2011.01)
*H04N 5/378* (2011.01)

(52) U.S. Cl.
CPC ........... *H04N 5/3577* (2013.01); *H04N 5/378* (2013.01)

(58) Field of Classification Search
CPC ............................ H04N 5/378; H04N 5/3577
USPC ........................................................ 348/308
See application file for complete search history.

(56) References Cited

U.S. PATENT DOCUMENTS

2009/0103827 A1* 4/2009 Ladd ................... G06K 9/40
382/260
2010/0259430 A1* 10/2010 Okamoto .......... H01L 27/14609
341/122

FOREIGN PATENT DOCUMENTS

KR 100746197 8/2007
KR 101573408 12/2015

* cited by examiner

*Primary Examiner* — Usman Khan
(74) *Attorney, Agent, or Firm* — IP & T Group LLP

(57) ABSTRACT

A pixel power noise cancelling apparatus may include: a ramp signal generator suitable for generating a ramp signal according to control of a controller; a pixel power noise copy unit suitable for copying a pixel power noise of a pixel column of a pixel array to superimpose on the ramp signal fed from the ramp signal generator to the pixel column and output a ramp signal with added pixel power noise; and a comparator suitable for comparing a pixel signal output by the pixel column with the ramp signal with added pixel power noise from the pixel power noise copy unit.

14 Claims, 4 Drawing Sheets

PIXEL POWER NOISE CANCELLING APPARATUS AND METHOD FOR COPYING AND SUPERIMPOSING PIXEL POWER NOISE OF PIXEL COLUMN ON RAMP SIGNAL

CROSS-REFERENCE TO RELATED APPLICATIONS

The present application claims priority under 35 U.S.C. 119(a) to Korean Patent Application No. 10-2015-0172947, filed on Dec. 7, 2015, which is incorporated herein by reference in its entirety.

BACKGROUND

1. Field

Various embodiments of the present invention relate generally to a complementary metal oxide semiconductor (CMOS) image sensor and, more particularly, a CMOS image sensor (CIS) having a pixel power noise cancelling apparatus and a pixel power noise cancelling method.

2. Description of the Related Art

A CMOS image sensor (CIS) is widely used in various applications since it operates at lower supply voltages, consumes less electric power than a charge coupled device (CCD) and is more advantageous in circuit integration because of the use of the CMOS process. Unlike a CCD, a CIS requires an operation of converting an analog output signal by a pixel array, such as an active pixel sensor (APS), into a digital signal. Typically, a CIS includes an internal high resolution analog-to-digital converter (ADC) for converting the analog signal to the digital signal.

A CIS may be categorized into a CIS using a single ADC or a CIS using a column ADC. The CIS using the single ADC includes a single ADC to convert the analog output signal of all the columns of a pixel array into a digital signal at a predetermined time. The CIS using the single ADC type offers a reduced chip size, but consumes more power because of its higher operation speed.

On the other hand, the CIS using the column ADC includes a plurality of simpler ADCs each disposed at a respective column of the pixel array. The CIS using the column ADC has a disadvantage of having a larger chip size than the CIS using the single ADC. However, the CIS using the column ADC consumes less power because it operates at a lower speed than the CIS using the single ADC.

The CIS using the column ADC performs correlated double sampling (CDS) on the analog output signal from the pixel array, stores a correlated-double sampled signal, and compares the correlated-double sampled signal with a reference voltage (i.e., a ramp signal) from a ramp signal generator to provide a comparison result signal for generating a digital code.

Moreover, the CIS using the column ADC employs separate power supplies for the pixel array and the ramp signal generator, which may cause pixel power noise and signal distortion caused by the pixel power noise.

Meanwhile, consumer demand for higher resolution images has spurred CIS manufacturers to develop higher resolution CIS. Pixels in a high resolution CIS are generally smaller than those in a lower resolution CIS to allow employing more pixels while maintaining or even reducing the chip size of the CIS. However, as the pixel size is getting smaller, the pixel noise and the resultant signal distortion become more serious issues. Thus, mitigation or prevention of image deterioration caused by pixel power noise is needed.

A differential type comparator is typically included in a conventional column ADC and generally shows good noise reduction characteristics for a power noise generated in a CDS circuit itself and a coupling noise caused by a switching operation, but is generally not effective for mitigating the pixel power noise generated in the pixel array that is external to the CDS circuit.

Conventionally, for addressing the above problem, when a ramp signal is generated by a ramp signal generator and mirrored to a comparator, the ramp signal generator is fed with a supply voltage of the pixel array to generate the pixel power noise for itself and then the generated noise is introduced into the pixel signal so that the pixel power noise is cancelled in the comparator.

Such a method may suppress the pixel power noise only when the pixel power noise generated in the plurality of columns is uniform, i.e., has the same magnitude and phase for each column. However, the pixel power noise in the plurality of columns is random in its magnitude and phase and thus the pixel power noise is not effectively suppressed. To make matters worse, the conventional method of reducing the pixel power noise may amplify the signal distortion by the random pixel power noise caused by the ramp signal from the ramp signal generator and the pixel signal from the pixel array.

The conventional method of reducing the pixel power noise may reduce some of the pixel power noise when an average pixel power noise is intentionally generated and introduced into the pixel signal. However, even doing so does not eliminate the actual pixel power noise of the plurality of columns which may have different magnitude and phase depending on each column location.

SUMMARY

Various embodiments are directed to a complementary metal oxide semiconductor (CMOS) image sensor (CIS), a pixel power noise cancelling apparatus included therein and a pixel power noise cancelling method. The pixel power noise cancelling method includes copying and superimposing a pixel power noise of a pixel column on a ramp signal fed to the corresponding pixel column.

In accordance with an embodiment of the present invention, a pixel power noise cancelling apparatus may include: a ramp signal generator suitable for generating a ramp signal according to control of a controller; a pixel power noise copy unit suitable for copying a pixel power noise of a pixel column of a pixel array to superimpose on the ramp signal fed from the ramp signal generator to the pixel column and output a ramp signal with added pixel power noise; and a comparator suitable for comparing a pixel signal output by the pixel column with the ramp signal with added pixel power noise from the pixel power noise copy unit.

In accordance with an embodiment of the present invention, a CMOS image sensor may include: a pixel array suitable for generating a pixel signal corresponding to incident light; a row decoder suitable for selecting and controlling pixels in the pixel array by a row line according to control of a control unit; a ramp signal generator suitable for generating a ramp signal; and a pixel power noise copy circuit suitable for generating a pixel-power-noise-added ramp signal of each column of the pixel array by copying a pixel power noise of each column of the pixel array and by superimposing the copied pixel power noise on the ramp signal for each column of the pixel array, and for outputting a pixel-power-noise-added ramp signal for each columns.

In accordance with another embodiment of the present invention, a pixel power noise cancelling method may include generating a ramp signal; generating a pixel-power-noise-added ramp signal by copying a pixel power noise of a pixel column of a pixel array and by superimposing the copied pixel power noise on the ramp signal; and comparing a pixel signal output by the pixel column with the pixel-power-noise-added ramp signal.

According to the embodiments, the pixel power noise of each column is copied and superimposed on the ramp signal fed to the corresponding pixel column so that the pixel power noise is cancelled in a comparator.

According to an embodiment, a pixel power noise copy unit having the same source follower structure as a unit pixel of the pixel array is inserted at an end position of a column line, i.e. before the comparator, to precisely copy the pixel power noise. The ramp signal is fed to a comparator corresponding to the column through the pixel power noise copy unit, and thus the pixel power noise occurring differently depending on the column locations may be eliminated effectively.

BRIEF DESCRIPTION OF THE DRAWINGS

The present invention will be described using various embodiments in conjunction with the following figures in which.

DETAILED DESCRIPTION

Figure 1:
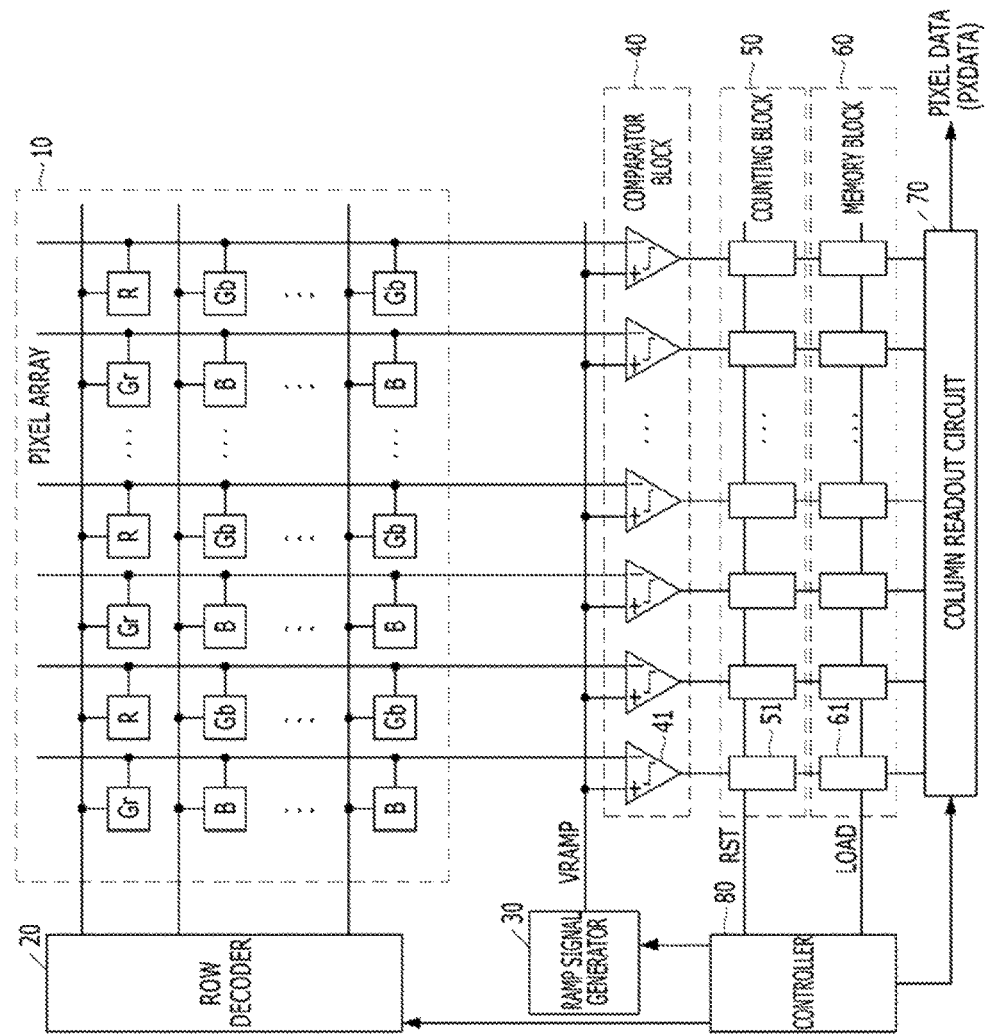
FIG. 1 is a block diagram illustrating a typical CMOS image sensor.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

Moreover, as used herein, singular forms are intended to include the plural forms as well, unless the context clearly indicates otherwise.

It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. However, we note that the present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a typical CMOS image sensor (CIS) of a column parallel structure.

Referring to FIG. 1, the CIS includes a pixel array 10, a row decoder 20, a ramp signal generator 30, a comparator block 40, a counting block 50, a memory block 60, a column readout circuit 70, and a controller 80.

The pixel array 10 generates and outputs pixel signals corresponding to incident light. The row decoder 20 selects pixels in the pixel array 10 by a row line under the control of the controller 80 including a timing generator to allow control of the operation of the pixels in the selected row line. The ramp signal generator 30 generates a ramp signal VRAMP under the control of the controller 80. The comparator block 40 compares each of the pixel signals output by the pixel array 10 with the ramp signal VRAMP from the ramp signal generator 30. The counting block 50 counts a clock from the controller 80 according to each of the output signals of the comparator block 40. The memory block 60 stores count information from the counting block 50 under the control of the controller 80. The column readout circuit 70 sequentially outputs the data stored in the memory block 60 as pixel data PXDATA under the control of the controller 80. The controller 80 controls the operation of the row decoder 20, the ramp signal generator 30, the counting block 50, the memory block 60, and the column readout circuit 70.

A correlated double sampling (CDS) refers to a method for eliminating an undesired offset which may exist intrinsically in the pixel output signal by the CIS. According to the CDS, a level of the pixel signal before the incidence of the light is subtracted from the level of the pixel signal when the light is incident on the CIS so as to allow a precise measurement of the pixel signal caused by the incident light. The CDS is performed in the comparator block 40.

The comparator block 40 includes a plurality of comparators, the counting block 50 includes a plurality of counters, and the memory block 60 includes a plurality of memories with one comparator, one counter, and one memory provided for each column of the pixel array 10.

An exemplary analog-to-digital converting operation performed for each column of the pixel array using the one comparator, one counter, and one memory is as follows.

A first comparator 41 receives the pixel signal from a first column of the pixel array 10 through its first input terminal and the ramp signal VRAMP from the ramp signal generator 90 through its second input terminal, and compares the signals to output a comparison signal.

The level of the ramp signal VRAMP decreases periodically over time and, as a result, there is an instant that two signals inputted to the first comparator 41 have the same level during a period of the ramp signal VRAMP. At such an instant, the comparison signal output by the comparator 41 will be inverted.

A first counter 51 counts the clock CLK output by the controller 80 from an instant that the ramp signal VRAMP starts to decrease to the instant that the comparison signal is inverted, and outputs count Information. The first counter 51 may be initialized by a reset signal RST from the controller 80.

A first memory 61 stores the count information received from the first counter 51 in response to a load signal LOAD from the controller 80, and outputs the count information to the column readout circuit 70.

Next, the effects of providing a positive supply voltage VDD and a ground or a negative supply voltage VSS to a pixel on the noise generated by that pixel is discussed below. In the following description, other kinds of noises such as a switching noise that are generated in transition periods will not be described for simplicity.

Figure 2:
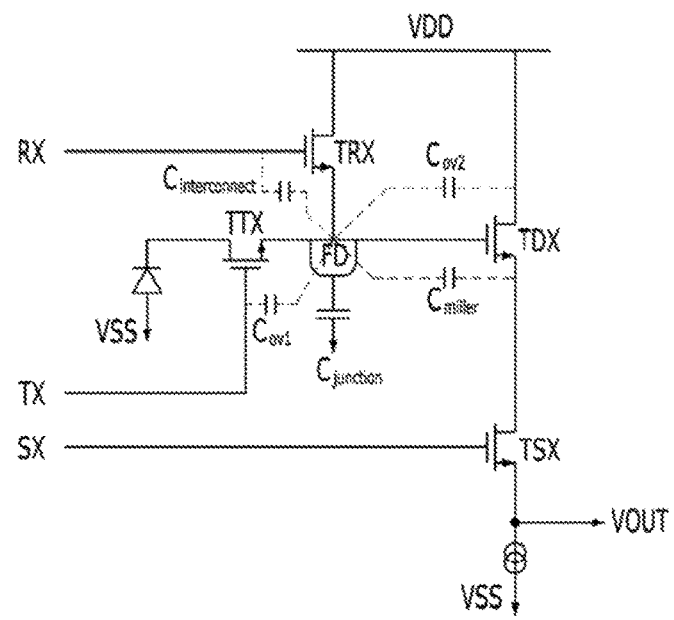
FIG. 2 is a circuit diagram of a general unit pixel.
Figure 3:
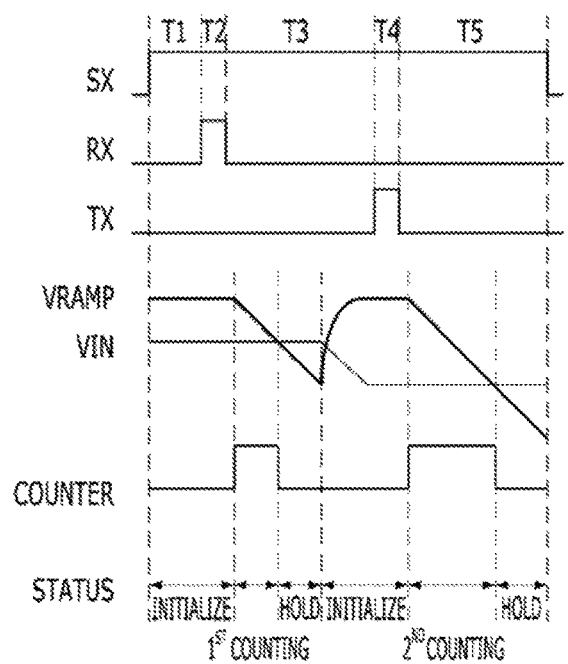
FIG. 3 is a timing chart illustrating the operations of the CMOS image sensor of FIG. 1 and the unit pixel of FIG. 2.

FIG. 2 is a circuit diagram of a general unit pixel for explaining an effect of the pixel power noise, and FIG. 3 is a timing chart illustrating the operations of the CIS of FIG. 1 and the unit pixel of FIG. 2.

In the timing chart of FIG. 3, an operation cycle is divided into a plurality of intervals and the overall operation of the CIS is depicted for each interval. A pixel signal VIN shown in FIG. 3 corresponds to a pixel signal VOUT output by the unit pixel of FIG. 2.

As shown in FIG. 3, the overall operation cycle of the CIS may be divided into an interval T1 of selecting a corresponding column line, an interval T2 of resetting a photodiode and transferring pixel reset signal, an interval of T3 of converting the pixel reset signal into data code and receiving light through the photodiode, an interval of T4 of transferring pixel signal voltage VSIG, and an interval of T5 of converting the pixel signal voltage VSIG into data code.

After a column line is selected in the Interval T1, a voltage level at a floating diffusion node FD is reset through a pixel reset operation in the interval T2. The voltage level at the floating diffusion node FD is determined as a reset voltage, and the reset voltage is transferred through a source follower to an output terminal to be output as the pixel signal VOUT. At this time, the voltage level at the floating diffusion node FD is determined by the photodiode. As a result, although the pixel power noise generated in the interval T2 may affect the voltage level at the floating diffusion node FD, the pixel power noise does not significantly affect the voltage level at the floating diffusion node FD because the effect of the pixel power noise is reduced by the photodiode in this interval. Subsequently, a reset transistor TRX and a transfer transistor TTX are turned off in the interval T3, and the reset voltage of the pixel undergoes a data conversion to convert the pixel reset signal into data code. At this time, however, the pixel power noise may significantly affect the reset voltage of the pixel as can be seen from following equation 1.

$$\Delta VOUT_{Noise} = \Delta V_{FD} + \Delta V_S \quad \text{[Equation 1]}$$

In equation 1, $\Delta VOUT_{Noise}$ denotes the pixel power noise, and $\Delta V_{FD}$ denotes a change in the voltage level at the floating diffusion node FD according to a change in the supply voltage VDD fed to the pixel. The supply voltage VDD affects the voltage level at the floating diffusion node FD due to a coupling capacitance connected between the supply voltage VDD and the pixel. $\Delta V_S$ denotes a voltage change due to a change in a current source caused by a supply voltage noise, and changes the pixel signal VOUT.

The supply voltage noise may be generated by various causes, and affects the voltage level at the floating diffusion node FD depending on conditions determined by control signals supplied to the pixel. The supply voltage noise eventually affects a signal path from the photodiode to the comparator block performing the CDS conversion process and reduces an accuracy of the pixel signal VOUT, and thus is one of the major reasons that deteriorate image qualities of the CIS.

The noise feature of the floating diffusion node FD is very important in the CIS. The capacitance at the floating diffusion node FD may be represented by following equation 2.

$$C_{FD} = C_{junction} + C_{overlap} + C_{miller} + C_{interconnect} \quad \text{[Equation 2]}$$

Here, '$C_{junction}$' denotes a junction capacitance, '$C_{overlap}$' denotes overlap capacitances, '$C_{miller}$' denotes a Miller capacitance, and '$C_{interconnect}$' denotes stray capacitances in the interconnections.

The following table summarizes capacitances between terminals for each operation region in a general transistor.

| Operation | Cgb | Cgs | Cgd |
|---|---|---|---|
| Cutoff | $C_{ox}WL_{eff}$ | 0 | 0 |
| Linear | 0 | $C_{ox}WL_{eff}/2$ | $C_{ox}WL_{eff}/2$ |
| Saturation | 0 | $(2/3)C_{ox}WL_{eff}$ | 0 |

Since a drive transistor TDX shown in FIG. 2 operates in a saturation region, a capacitance Cgd between its gate and drain and a capacitance Cgb between its gate and a substrate are almost zero, and a capacitance Cgs between its gate and source has a largest value as can be seen from the table. The capacitance Cgs may be regarded as the Miller capacitance since it is connected between an input and output of the source follower. It can be seen from the equation 2 and the table that the capacitance that transfers most of the noise in the supply voltage to the floating diffusion node FD is the junction capacitance if the overlap capacitances associated with signals are excluded. In an NMOS-based unit pixel structure shown in FIG. 2, a p-type substrate is biased to the ground voltage VSS, and thus the effect from a node of the positive supply voltage VDD is trivial and most of the power noise is originated from changes in the ground voltage VSS.

Thus, a ground voltage noise is transmitted to the floating diffusion node FD through a junction capacitance coupling, and the change in the voltage level at the floating diffusion node FD due to the ground voltage noise is transmitted to the output terminal of the pixel through the source follower and affects the pixel signal VOUT. Since a gain of the source follower is at a level of 0.85~0.9, the final effect of the ground voltage noise on the pixel signal VOUT may be expressed by following equation 3.

$$\Delta VOUT_{Noise} = \Delta VSS * C_{FD\text{-}junction} * GAIN_{(Source\text{-}Follower)} + \Delta V_S$$
$$= 0.85 * \Delta VSS * C_{FD\text{-}junction} + \Delta V_S$$

[Equation 3]

Here, $\Delta VOUT_{Noise}$ denotes the pixel power noise, and $\Delta VSS$ denotes the change in the supply voltage VSS.

As described above, a noise that is introduced in the supply voltage VDD or VSS during the operation of the CIS may cause changes in the voltage level at the floating diffusion node FD and the pixel signal VOUT, which eventually may result in an error during the data conversion.

However, a differential comparator commonly used in the column ADC shown in FIG. 1 has a drawback of being unable to eliminate the pixel power noise generated in the pixel array that is external to the CDS circuit.

In order to solve the above problem, it can be contemplated to provide the ramp signal generator with a supply voltage of the pixel array to generate and introduce the pixel power noise into the pixel signal VOUT when the ramp signal VRAMP is generated by the ramp signal generator and mirrored to the comparator, so that the pixel power noise is cancelled in the comparator. Such a method, however, may not eliminate the actual pixel power noise of which magnitude or phase differs depending on the location of the column.

In accordance with an embodiment of the present invention, the pixel power noise of each column is copied and superimposed on the ramp signal fed to the corresponding column so that the pixel power noise is cancelled in the comparator corresponding to the column. In more detail, a pixel power noise copy unit having the same source follower structure as a unit pixel of the pixel array is inserted at an end position of a column line (i.e., before the comparator) to precisely copy the pixel power noise. The ramp signal is fed through the pixel power noise copy unit to a comparator corresponding to the column, and thus the pixel power noise occurring differently depending on the column locations may be eliminated effectively. The configuration of an apparatus for eliminating the pixel power noise and the eliminating operation will be described in more detail with reference to FIG. 4.

Figure 4:
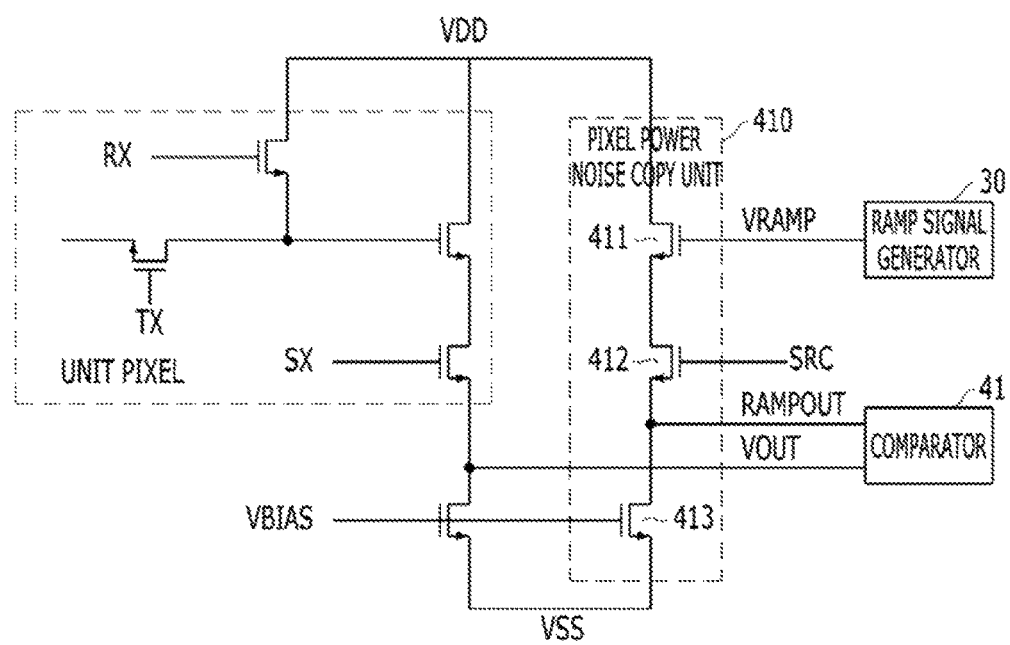
FIG. 4 is a circuit diagram of a pixel power noise cancelling apparatus, in accordance with an embodiment of the present invention.

FIG. 4 is a circuit diagram of a pixel power noise cancelling apparatus, in accordance with an embodiment of the present invention.

The pixel power noise cancelling apparatus shown in FIG. 4 may include a ramp signal generator 30, a pixel power noise copy unit 410, and a comparator 41. The ramp signal generator 30 generates the ramp signal VRAMP under a control of a controller 80 (e.g., a timing generator).

The pixel power noise copy unit 410 copies the pixel power noise of one column to superimpose on the ramp signal fed from the ramp signal generator 30 to the corresponding column to output a pixel-power-noise-added ramp signal. The comparator 41 compares a pixel signal VOUT from the corresponding column with the pixel-power-noise-added ramp signal from the pixel power noise copy unit 410.

The pixel power noise copy unit 410 is disposed at an end position of the pixel array 10 for each column of the pixel array 10 and copies the pixel power noise of an associated column precisely. The pixel power noise copy unit 410 may be implemented by a same source follower structure as the unit pixel in its associated column of the pixel array 10. Thus, the pixel power noise copy unit 410 shown in FIG. 4 includes a drive transistor 411, a select transistor 412, and a pixel bias transistor 413. The ramp signal VRAMP from the ramp signal generator 30 is fed to a gate terminal of the drive transistor 411 having the source follower connection. Meanwhile, a select signal SRC is fed from the controller 80 to a gate of the select transistor 512.

The principle of cancelling the pixel power noise in the present embodiment is as follows.

Conventionally, the comparator block 40 compares the pixel signal VOUT from the pixel array 10 with the ramp signal VRAMP from the ramp signal generator 30, and thus the pixel power noise $\Delta VOUT_{Noise}$ in the pixel signal VOUT is reflected to the comparison result signal output by the comparator block 40.

In the embodiment of the present invention, however, the comparator block 40 compares the pixel signal VOUT from the pixel array 10 with the pixel-power-noise-added ramp signal RAMPOUT rather than the original ramp signal VRAMP from the ramp signal generator 30, which is described below in more detail.

The pixel power noise copy unit 410 is installed at an end position of the pixel array 10 for each column line. When the ramp signal VRAMP from the ramp signal generator 30 passes the pixel power noise copy unit 410, the pixel power noise is copied and superimposed on the ramp signal VRAMP to generate the pixel-power-noise-added ramp signal RAMPOUT. Thus, the pixel-power-noise-added ramp signal RAMPOUT is fed to the comparator 41.

Reviewing the signals in mathematical forms, the pixel signal VOUT output by the pixel array 10 may be expressed by the following equation 4.

$$VOUT = VPIXEL + \Delta VOUT_{Noise}$$ [Equation 4]

Here, VPIXEL denotes a detected pixel signal, and $\Delta VOUT_{Noise}$ denotes the pixel power noise.

Conventionally, the pixel signal VOUT output by the pixel array 10 and the ramp signal VRAMP from the ramp signal generator 30 are directly input to the comparator 41, and the comparison result signal output by the comparator 41 contains an error represented by the component of $\Delta VOUT_{Noise}$. Contrarily, in accordance with the present embodiment, the pixel-power-noise-added ramp signal RAMPOUT from the pixel power noise copy unit 410 is fed to the comparator 41 instead of the ramp signal VRAMP, and the pixel-power-noise-added ramp signal may be expressed by following equation 5.

$$RAMPOUT = VRAMP + \Delta VOUT_{Noise}$$ [Equation 5]

Here, VRAMP denotes the ramp signal output by the ramp signal generator 30, and $\Delta VOUT_{Noise}$ denotes the pixel power noise.

The comparator 41 compares the pixel signal VOUT, which is containing the pixel power noise $\Delta VOUT_{Noise}$, with the pixel-power-noise-added ramp signal RAMPOUT from the pixel power noise copy unit 410. Accordingly, the pixel power noise $\Delta VOUT_{Noise}$ commonly contained in the pixel signal VOUT and with the pixel-power-noise-added ramp signal RAMPOUT is cancelled.

The noise component being originated from the current source below the pixel array 10 may be completely eliminated in a manner described above. Also, the noise at the ground voltage node that is introduced because of the biasing of the p-type substrate of the pixel array 10 to the ground voltage VSS may be eliminated similarly since the noise also is mixed in the pixel-power-noise-added ramp signal RAMPOUT as described in equation 5.

Figure 5:
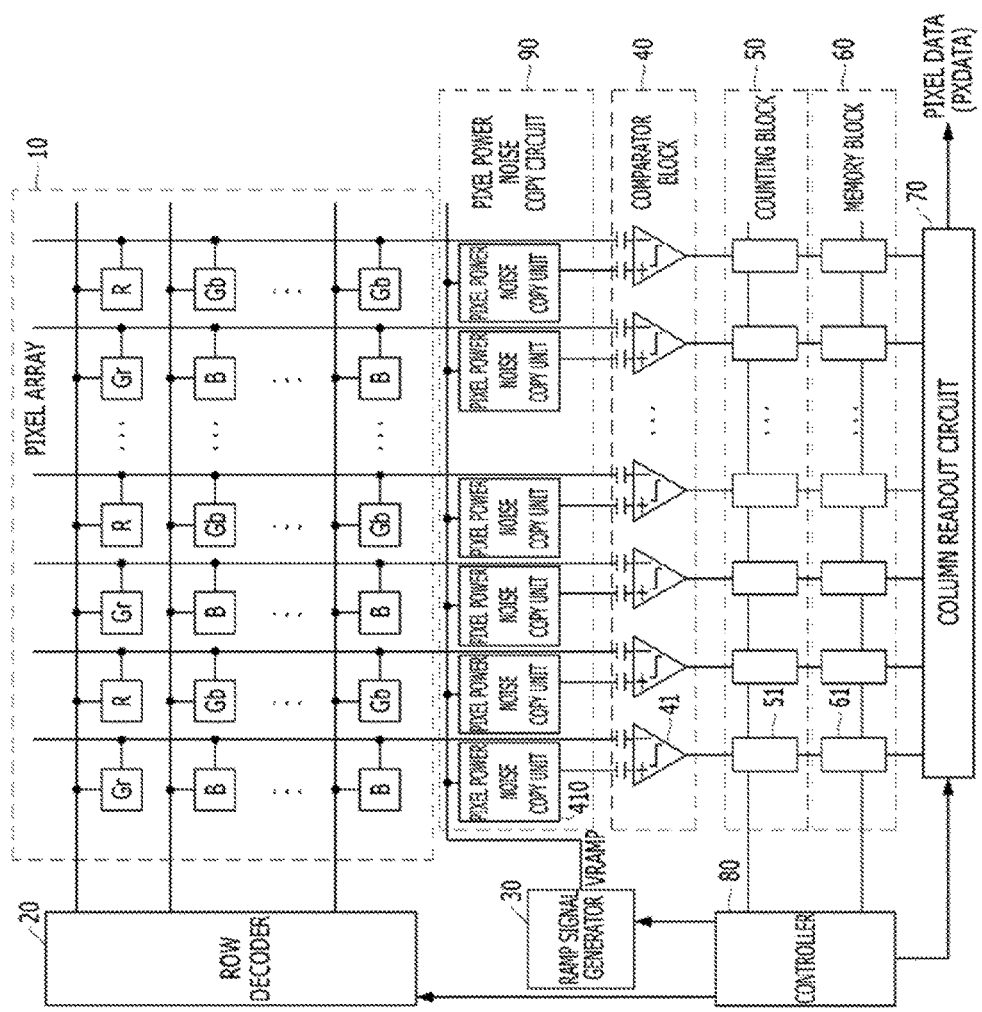
FIG. 5 is block diagram of a CMOS image sensor including the pixel power noise cancelling apparatus, in accordance with an embodiment of the present invention.

FIG. 5 is block diagram of a CIS including the pixel power noise cancelling apparatus, in accordance with an embodiment of the present invention.

The CIS shown in FIG. 5 includes a pixel array 10, a row decoder 20, a ramp signal generator 30, a pixel power noise copy block 90, a comparator block 40, a counting block 50, a memory block 60, a column readout circuit 70, and a controller 80.

The pixel array 10 generates and outputs pixel signals corresponding to incident light. The row decoder 20 selects pixels in the pixel array 10 by a row line under a control of the controller 80 (e.g., a timing generator) so as to allow control of the operation of the pixels in the selected row line. The ramp signal generator 30 generates a ramp signal VRAMP under the control of the controller 80. The pixel power noise copy block 90 copies the pixel power noise of each column to superimpose on the ramp signal VRAMP fed from the ramp signal generator 30 to the corresponding column. The comparator block 40 compares each of the pixel signals output by the pixel array 10 with the pixel-power-noise-added ramp signal RAMPOUT from the pixel power noise copy block 90. The counting block 50 counts the clock from the controller 80 according to each of the output signals of the comparator block 40. The memory block 60 stores count information from the counting block 50 under the control of the controller 80. The column readout circuit 70 sequentially outputs the data stored in the memory block 60 as pixel data PXDATA under the control of the controller 80. The controller 80 controls the operation of the row decoder 20, the ramp signal generator 30, the counting block 50, the memory block 60, and the column readout circuit 70.

The configuration of the pixel power noise copy unit 410 in the pixel power noise copy block 90 is the same as that shown in FIG. 4.

As described above, according to an embodiment, a pixel power noise copy unit having the same source follower structure as a unit pixel of the pixel array is inserted at an end position of a column line. The pixel power noise copy unit precisely copies the pixel power noise and superimposes on the ramp signal fed to the column, so that non uniform pixel power noise occurring on the various column locations may be eliminated effectively.

Although various embodiments have been described for illustrative purposes, it will be apparent to those skilled in the art to which this invention pertains that various changes and modifications may be made without departing from the spirit and scope of the invention as defined in the following claims.

What is claimed is:

1. An apparatus for cancelling a pixel power noise, comprising:
 a ramp signal generator suitable for generating a ramp signal according to control of a controller; and
 a pixel power noise copy unit suitable for generating a pixel-power-noise-added ramp signal by copying a pixel power noise of each pixel column of a pixel array and by superimposing the copied pixel power noise on the ramp signal,
 wherein a unit pixel in each pixel column of the pixel array has a first source follower, and the pixel power noise copy unit comprises a second source follower of the same structure as the first source follower of the unit pixel at each pixel column.

2. The pixel power noise cancelling apparatus of claim 1, further comprising:
 a comparator suitable for comparing a pixel signal output by each pixel column with the pixel-power-noise-added ramp signal.

3. The pixel power noise cancelling apparatus of claim 2, wherein the pixel power noise copy unit is disposed at an end position of the pixel array for each pixel column of the pixel array.

4. The pixel power noise cancelling apparatus of claim 1, wherein the first source follower comprises a drive transistor, a select transistor, and a pixel bias transistor.

5. The pixel power noise cancelling apparatus of claim 4, wherein the drive transistor receives the ramp signal from the ramp signal generator through its gate terminal.

6. A CMOS image sensor, comprising:
 a pixel array suitable for generating a pixel signal corresponding to incident light;
 a row decoder suitable for selecting and controlling pixels in the pixel array by a row line according to control of a control unit;
 a ramp signal generator suitable for generating a ramp signal; and
 a pixel power noise copy circuit suitable for generating a pixel-power-noise-added ramp signal of each column of the pixel array by copying a pixel power noise of each column of the pixel array and by superimposing the copied pixel power noise on the ramp signal for each column of the pixel array, and for outputting a pixel-power-noise-added ramp signal for each columns,
 wherein a unit pixel in each column of the pixel array has a first source follower, and each of the pixel power noise copy units comprises a second source follower of the same structure as the first source follower of the unit pixel at each column.

7. The CMOS image sensor of claim 6, further comprising:
 a comparator unit suitable for comparing a pixel signal of each column of the pixel array with a corresponding pixel-power-noise-added ramp signal;
 a counting unit suitable for counting a clock according to an output signal of the comparator;
 a memory unit suitable for storing count information from the counting unit; and
 a column readout circuit suitable for outputting data stored in the memory unit.

8. The CMOS image sensor of claim 7, wherein the pixel power noise copy circuit comprises:
 a plurality of pixel power noise copy units respectively corresponding to columns of the pixel array, and disposed at an end position of the pixel array,
 wherein each pixel power noise copy unit generates a pixel-power-noise-added ramp signal of a corresponding column by copying a pixel power noise of the corresponding column and by superimposing the copied pixel power noise on the ramp signal of the corresponding column.

9. The CMOS image sensor of claim 6, wherein the first source follower comprises a drive transistor, a select transistor, and a pixel bias transistor.

10. The CMOS image sensor of claim 9, wherein the drive transistor receives the ramp signal from the ramp signal generator through its gate terminal.

11. A pixel power noise cancelling method, comprising:
generating a ramp signal;
  generating a pixel-power-noise-added ramp signal by copying a pixel power noise of each pixel column of a pixel array and by superimposing the copied pixel power noise on the ramp signal; and
comparing a pixel signal output by each pixel column with the pixel-power-noise-added ramp signal,
wherein a unit pixel in each pixel column of the pixel array has a first source follower, and each of the pixel power noise copy units comprises a second source follower of the same structure as the first source follower of the unit pixel array at each pixel column.

12. The pixel power noise cancelling method of claim 11, wherein the CMOS image sensor comprises a pixel array having a plurality of unit pixels arranged in a plurality of rows and columns, and a pixel power noise copy circuit comprising a plurality of pixel power noise copy units each pixel power noise copy unit respectively corresponding to each pixel column of the pixel array, and disposed at an end position of the pixel array, and
  wherein the generating a pixel-power-noise-added ramp signal includes each pixel power noise copy unit generating a pixel-power-noise-added ramp signal of a corresponding pixel column by copying a pixel power noise of the corresponding pixel column and by superimposing the copied pixel power noise on the ramp signal of the corresponding pixel column.

13. The pixel power noise cancelling method of claim 11, wherein the first and second source followers comprise a drive transistor, a select transistor, and a pixel bias transistor.

14. The pixel power noise cancelling method of claim 13, wherein the drive transistor receives the ramp signal through its gate terminal.

* * * * *